March 2, 1971   F. SCHULZE   3,567,392
METHOD AND APPARATUS FOR ANALYSIS OF GASES FOR SULFUR DIOXIDE
Filed April 23, 1968   2 Sheets-Sheet 1

INVENTOR
FERDINAND SCHULZE

BY *Plumley, Tyner & Sandt*
ATTORNEYS

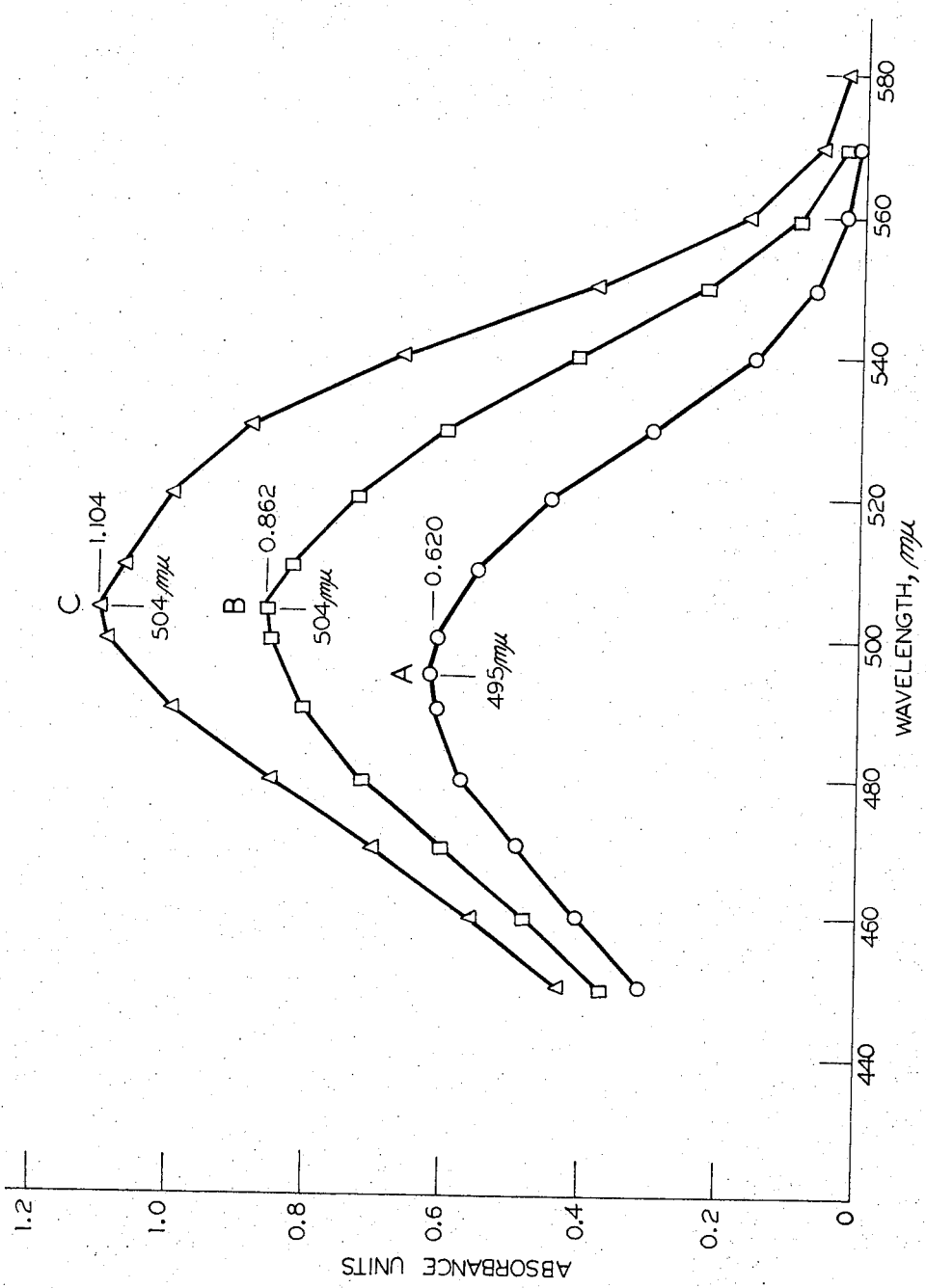

United States Patent Office 3,567,392
Patented Mar. 2, 1971

3,567,392
METHOD AND APPARATUS FOR ANALYSIS OF GASES FOR SULFUR DIOXIDE
Ferdinand Schulze, 3205 Fordham Road,
Wilmington, Del. 19807
Filed Apr. 23, 1968, Ser. No. 723,419
Int. Cl. G01n 21/28, 31/06, 31/22
U.S. Cl. 23—232　　　　　　　　　　　　　　　　5 Claims

ABSTRACT OF THE DISCLOSURE

Sulfur dioxide in gas mixtures is determined by absorbing the sulfur dioxide in an alkaline solution containing a p-aminophenyl-azobenzene dye, e.g., p-(p-aminophenylazobenzene) sulfonic acid salt, then reacting with an acidic solution containing formaldehyde to form the more highly colored N-methyl sulfonic acid derivative of the dye and spectrally measuring the dye-derivative solution to determine the amount of sulfur dioxide.

Figure 1:
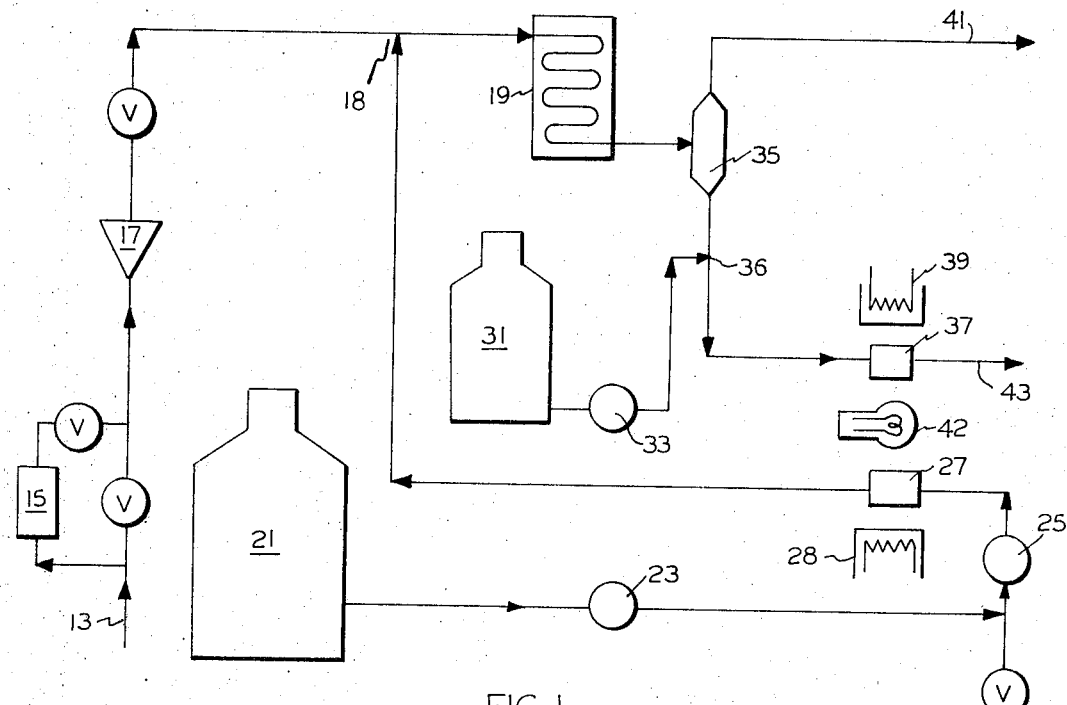
Figure 3:
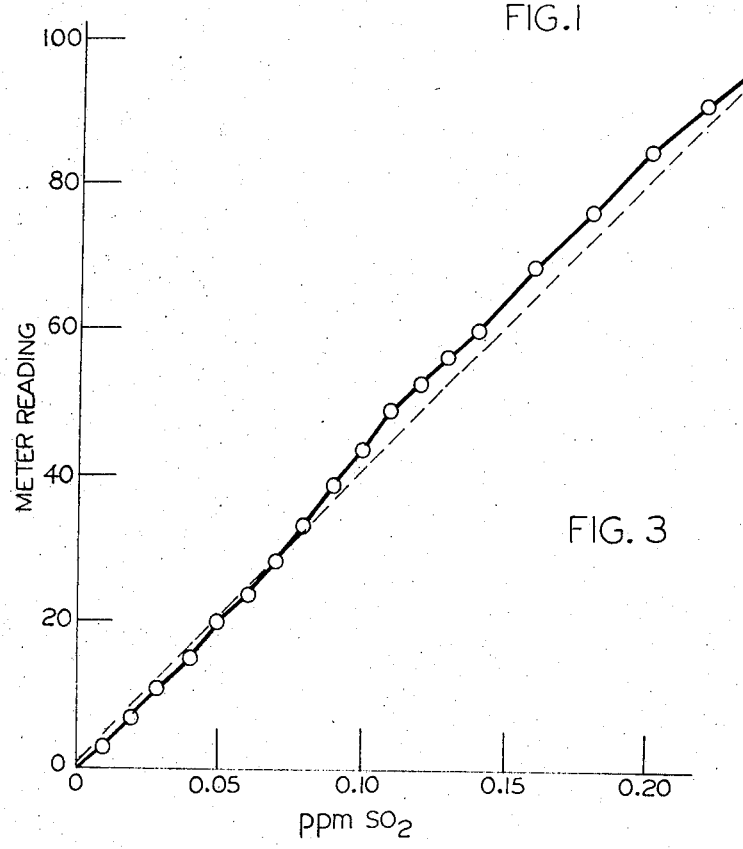

The method is highly suitable for an apparatus for the continuous analysis of air, as in air pollution control, by providing pumping, metering and mixing of the gas and reagent streams in the proper sequence and photometric scanning of the resultant solution.

---

This invention relates to methods and apparatus for the analysis and measurement of sulfur dioxide constituents in gas samples and, more particularly, methods and apparatus making possible continuous and automatic measurements of sulfur dioxide.

Sulfur dioxide is one of the most important air pollutants. Its occurrence in air is wide-spread as a result of industrial and commercial use in bleaching, fumigation, refrigeration, manufacture of sulfuric acid, etc. A significant amount of sulfur dioxide is released as a by-product in the burning of sulfur-containing fuels and in the smelting of many ores. It is also released during the manufacture of paper by the sulfite process and in such chemical operations as the synthesis of phenol.

The maximum allowable concentration of sulfur dioxide in air (threshold limit value, TLV) is generally accepted as 5 p.p.m. However, sulfur dioxide may be toxic to vegetation in concentrations of about 2 to 3 p.p.m. and is corrosive to metallic construction materials in concentrations of less than 1 p.p.m. It is extremely irritating to the respiratory system, causing coughing at 8 to 12 p.p.m. and eye irritation at 20 p.p.m. Although as little as 4 p.p.m. can be detected by odor, the olfactory senses become quickly insensitive to it and the concentrations necessary for detection increase. Because of the aforementioned hazards, coupled with the foreseeable enactment of specific legislation setting sulfur dioxide tolerance at 0.1 p.p.m. levels, it is important to have a continuous, automatic, accurate and legally acceptable method and apparatus for the monitoring of sulfur dioxide in the atmosphere.

It is, therefore, an object of this invention to provide a system for the analysis of gases for sulfur dioxide.

It is a further object of this invention to provide a method and apparatus for the continuous and automatic measurement of sulfur dioxide.

Still another object of this invention is to provide a simplified and reproducible method for the detection of sulfur dioxide.

Still another object of this invention is to provide a method for the detection of sulfur dioxide which is free from the effects of common interfering gases.

Other objects and advantages of this invention will be apparent from the following description and drawings.

Colorimetric methods for the analysis of gases in general, and sulfur dioxide specifically, are known. Broadly, these methods depend on the principle of absorbing the gas to be tested in an aqueous testing medium which contains a reagent capable of spectral change upon contact and/or reaction with the gas to be tested. The spectral change may be a shift in the absorption characteristics of the reagent, i.e., a change in shade or merely a change in density, i.e., a change in the degree of color or absorption of the reagent. By relating the spectral characteristics of the absorbing solution before any gas has been absorbed with the absorbing solution which contains the gas to be tested and by comparing this to absorbing solutions containing known amounts of gas, the amount of gas in the test sample can be easily ascertained.

Briefly, the present invention depends on the fact that sulfur dioxide plus formaldehyde in the presence of acid will react with certain free amino-containing dyes to form the more highly colored N-methyl sulfonic acid derivative of the dye. The reaction may be represented by the following equation:

$$\text{Dye-NH}_2 + \text{CH}_2\text{O} + \text{SO}_2 = \text{Dye-NH—CH}_2\text{—SO}_3\text{H}$$

In practice, the gas to be tested is absorbed in an aqueous alkaline, e.g., sodium hydroxide, solution of the dye. Subsequently, a second solution containing formaldehyde and excess acid to neutralize the alkali of the first solution and to provide sufficient acidity to promote the color-forming reaction is incorporated and the color reaction is completed.

The dyes which have been found useful for the method of this invention are, in general, free amino-containing dyestuffs. Preferably, they contain one free amino group and have the formula:

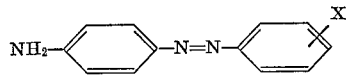

wherein X is selected from the group consisting of ortho-, meta-, and para-sulfo ortho-, meta-, and para-hydroxy; ortho-, meta-, and para-carboxyl. Advantages of these dyes are: water and alkali solubility, absence of organophilicity, rapid reaction rate, absence of side reactions, absence of hyposchromic spectral shift, and excellent adherence to Beer's Law.

Particularly preferred dyes for use in the practice of this invention are the sulfonic acid substituted derivatives corresponding to the above formula and, specifically, p-(p-aminophenyl-azobenzene) sulfonic acid or its sodium salt and m-(p-aminophenyl-azobenzene) sulfonic acid or its sodium salt. Other dyes in which X is hydrogen, amino, dimethylamino, nitro, sulfamido, have been examined but found less useful for the method of this invention because of slower rate of color formation, organophilicity, lack of water solubility, weaker color development, and tendency for side reactions.

It is recognized that certain free amino dyes such as para-rosaniline have been used for sulfur dioxide analysis and that these known methods depend on the same principle utilized in this invention; namely, the formation of the more highly colored N-methyl sulfonic acid derivative of the dye by the reaction of the dye with formaldehyde and sulfur dioxide. These methods are not entirely satisfactory, especially for the continuous, automatic analysis for sulfur dioxide, because of slowness of color-forming reaction, the complexity, nature and number of reagents, and a variety of other reasons.

Kniseley and Throop disclose a method which utilizes p-aminoazobenzene as the detector dye in sulfur dioxide analysis [Kniseley, S. J., Throop, L. J., "p-Aminoazobenzene for Spectrophotometric Determination of Sulfur Dioxide," Analytical Chemistry, Vol. 38, No. 9, p. 1270 (1966)]. In the method disclosed, however, sodium tetrachloromercurate reagent is used as a sulfur dioxide absorbent. This reagent is highly toxic and expensive and not well suited for a method which is continuous and requires relatively large amounts of reagent solution. The method of this invention defines an improvement by using sodium hydroxide as the preferred sulfur dioxide absorbing agent. A further distinction and improvement exists in the dye itself. The dye of Kniseley and Throop is p-aminoazobenzene. This dye has limited water solubility and tends to be absorbed by plastic parts, e.g. plastic tubing, used in the apparatus. The preferred dyes utilized in the process of this invention are substituted p-aminoazobenzenes which contain water solubilizing groups which impart improved water solubility and decreased absorption on plastic. A significant advantage of these dyes is their greater reaction speed. The preferred dye, p-(p-aminophenyl-azobenzene) sulfonic acid, requires only 90 seconds for full development of color. Pararosaniline, as used in the present official ASTM method, requires 20 minutes for color development.

Only three reagents are absolutely necessary for the practice of this invention: the dye above and formaldehyde, plus sufficient acid to yield a moderately acidic reaction medium. In general, the reagents may be present in the test solutions in widely varying proportions. It is, of course, important that at least 1 mole of each of the dye and the formaldehyde be provided for each mole of sulfur dioxide contained in the sample gas. For practical reasons, such as solubility and detectability of the dye and color changes therein, certain proportions are preferred. For instance, the concentrations of the dye should be small but such that the dye and changes therein are spectrally detectable with photometric or colormetric instruments. The dye can advantageously be used in amounts ranging from 0.002 to 0.2 g./l. Formaldehyde can be used in amounts ranging from about 0.1 to 20.0 g./l. As will be hereinafter disclosed, the method of this invention is intended primarily for use in a continuous manner in an apparatus specifically designed for the purpose. Consequently, flow rates of the various reagents can be adjusted in order to allow considerable flexibility in the concentration of the original reagent solutions. Concentrations of reagents which have been found to be particularly useful are, on the order of, 0.02 g./l. of the dye and 10 g./l. of the formaldehyde. As mentioned previously, it is preferred that the reagents be introduced separately. Preferably, the dye is dissolved in an aqueous solution containing about 0.2 g./l. of sodium hydroxide into which the sample gas is introduced and absorbed. The formaldehyde is preferably incorporated in a second solution containing about 200 ml. of concentrated hydrochloric acid per liter. When the above preferred concentrations are used, the air sample is metered in at about one liter per minute, the first reagent solution is metered in at one ml. per minute, and the second reagent solution is metered in at 0.05 ml. per minute. The reagent proportions and metering rates are designed to provide a final solution containing absorbed sulfur dioxide, which contains about 0.02 g. of the dye reagent, about 10 ml. of formaldehyde, and 10 ml. of hydrochloric acid per liter of the composite reagent solution.

The described order of reaction; namely, absorption of the sulfur dioxide-containing gas in the alkaline dye solution, and subsequent addition of acidic-formaldehyde solution are preferred. Any other order of reaction can be used, with the important precaution that formaldehyde and sulfur dioxide should not be contacted before the introduction of the dye since formaldehyde and sulfur dioxide or sulfites form addition compounds which do not react with dye to form the developed colors. Observing this general precaution, any other order of mixing may be used and is considered equivalent to the preferred order of mixing disclosed. It is also preferred that the sulfur dioxide-containing gas be absorbed in a neutral or alkaline medium. An alkaline medium is most preferred because it results in the best solubility or absorption of the sulfur dioxide component of the test gas. Sodium hydroxide is the preferred alkali.

As described, a spectral determination is made of the solution containing the dye derivative which results from the reaction of the dye reagent with formaldehyde and sulfur dioxide. These determinations are made by methods well-known in the art. They can be made by colorimetric, photometric or spectrophotometric devices. It is preferred that the measurements be made in the visual spectrum and with a device which does not depend on visual interpretations. Such devices include photometers with proper filters and spectrophotometers.

Certain refinements can be made in the described method without affecting the general mode of operation of this invention. For instance, the problem of interfering gases may be eliminated. An interfering gas is one which differs from the gas tested for, i.e., sulfur dioxide in this invention, but nevertheless causes a reaction and results in an erroneous determination of the amount of gas tested for. The error may be positive or negative, i.e., the interferant gas may have either a bleaching or intensifying effect on the reagent dye.

Ozone, nitrogen dioxide, hydrogen sulfide, and mercaptans are commonly present in industrially polluted air. It has been found that hydrogen sulfide and mercaptans have no interferant effect. Nitrogen dioxide interferes negatively by bleaching the color from either the parent dye or the dye derivative. This interference can be eliminated by the incorporation of a small amount, e.g., 0.5 g./l. of sulfamic acid in the alkaline absorbant solution. Ozone probably has negative (bleaching) interferant effect. Ozone can be eliminated by filtering the sample gas through hydrated or anhydrous granular ferrous sulfate. This filtration does not affect the sulfur dioxide content of the sample gas.

As mentioned, the method of this invention is particularly adapted for use in an apparatus to provide the continuous, automatic monitoring of sulfur dioxide contained in a gas. The apparatus may be described by reference to FIG. 1, which is a schematic representation. The air sample is continuously fed at 13 to the rotameter 17, either directly or through the filter 15. Simultaneously, a continuous flow of the first reagent solution containing alkaline dye is fed from reservoir 21 to a metering pump 23, through measuring bulb 25 and measuring flow cell 27 which is equipped with photometer device (lamp 42 and photocell 28, and to the junction 18 where it meets the flow of gas sample. The combined gas and first reagent stream pass through the helix 19 for mixing and to the air-liquid separator 35. The air of the sample gas is eliminated from the system at 41. The second reagent solution is fed from reservoir 31 to a metering pump 33, and joins the deaerated first solution (containing absorbed sulfur dioxide) at the junction 36. The two solutions are mixed and reacted during their passage to measuring flow cell 37 which is provided with a photometer device (lamp 42 and photocell 39) and is equipped with a continuous recording device. The measured solution is evacuated from the system at 43.

The invention is further illustrated by the following example which is a preferred embodiment.

EXAMPLE

This example illustrates typical concentrations and metering rates which are operative in the practice of the method of this invention, in a continuous fashion.

An air sample containing sulfur dioxide, metered at 1 liter per minute, is contacted with reagent containing 0.02 g./l. of p-(p-aminophenylazobenzene) sulfonic acid sodium salt and 0.2 g./l. of sodium hydroxide and 0.5 g./l. of sulfamic acid sodium salt metered in at 1 ml. per minute, in a glass helix. Air and reagent flow concurrently down through the helix.

At the outlet of the helix air and reagent are separated,

Immediately below the separator a second reagent containing 200 ml. of concentrated hydrochloric acid, 200 ml. of 40% formaldehyde, and 600 ml. of water is metered into the main reagent stream at 0.05 ml./min. These proportions are designed to yield 10 ml. each of concentrated hydrochloric acid and formaldehyde per liter of composite reagent.

The color-forming reaction takes place between the junction of the two reagent streams and the flow cell of a photometer. A 6 in. length of ⅛" I.D. tubing has been found sufficient to give adequate lag time for completion of the color-forming reaction.

The colored solution is measured in a photometer previously calibrated with solutions containing known amounts of sodium metabisulfite or containing known amounts of asborbed sulfur dioxide.

Spectral absorbance of the composite reagent used in the foregoing example is plotted as Curve A of FIG. II. It is seen that the reagent containing no sulfur dioxide has peak absorbance of 0.620 at 495 m$\mu$. Addition of 0.524 $\mu$g./l. of sulfur dioxide, which would correspond to 0.2 p.p.m. in an analysis conducted according to the example, produces a bathochromic shift to 0.862 absorbance units at 504 m$\mu$, shown in Curve B. Further addition of sulfur dioxide, corresponding to 0.4 p.p.m. sulfur dioxide in an air sample, produces an increase in absorbance to 1.104 units, also at the same peak wave length of 504 m$\mu$, as shown in Curve C. The difference of 0.242 absorbance units between peaks of Curves B and A, and between Curves C and B indicates excellent agreement with Beer's Law.

Further demonstration of agreement with Beer's Law is obtained when progressive increments of sulfur dioxide, from 0 to 0.25 p.p.m. in sample air, is added to an analyzer standardized for full scale reading of 100 with 0.25 p.p.m. sulfur dioxide. Results of this test are plotted in FIG. III. It is seen that successive points on the curve fall on practically a straight line, which shows that the reagent produces excellent linearity of response.

Although the invention has been described in considerable detail with reference to certain preferred embodiments thereof, it will be understood that variations and modifications can be effected within the spirit and scope of the invention as described above and as defined in the appended claims.

What is claimed is:

1. A method for the quantitative determination of sulfur dioxide contained in a gas mixture, comprising the steps of:

(1) mixing a known amount of said gas mixture and a known amount of a first reagent to form a first solution;

(2) mixing a known amount of said first solution and a known amount of a second reagent to form a second solution;

(3) measuring the spectral qualities of siad second solution and comparing this with the spectral qualities of standard solutions containing known amounts of sulfur dioxide, said standard solutions having been reacted in a manner identical to siad second solution, in order to determine the amount of sulfur dioxide in said gas mixture;

said first reagent comprising an aqueous solution containing as solute a small but spectrally detectable amount of a compound having the formula:

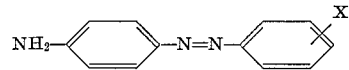

wherein X is selected from the group consisting of ortho-, meta-, and parasulfo; ortho-, meta-, and para-hydroxy; and ortho-, meta-, and para-carboxyl; said second reagent comprising an aqueous solution of an acidic material and formaldehyde, the amounts of said compound and said formaldehyde being selected to provide molar excesses of each relative to said sulfur dioxide in said second solution; the amount of said acidic material being selected to provide an acidic environment in said second solution.

2. The method of claim 1 wherein said first reagent contains as said compound, m- or p-(p-aminophenyl)-azobenzene) sulfonic acid sodium salt.

3. The method of claim 1 wherein said second reagent contains hydrochloric acid as said acidic material.

4. The method of claim 1 wherein said gas mixture, first reagent, and second reagent are supplied as continuous streams, continuously mixed into first and second solutions and spectrally measured in a continuous fashion.

5. The method of claim 1 wherein said gas mixture is filtered through ferrous sulfate prior to formation of said first solution.

References Cited
UNITED STATES PATENTS 2,639,980   5/1953   Francis _____ 23—254
2,812,242   11/1957   Krasl et al. _____ 23—254

OTHER REFERENCES

Colour Index, vol. 3, p. 3038 (1956).
Fierz-David, H. E. et al., Fundamental Processes of Die Chemistry, pp. 6, 82–5, 250 (1949).
Kniseley, S. J., Analytical Chemistry, vol. 38, pp. 1270–1 (1966).
West, P. W. et al., Analytical Chemistry, vol. 28, pp. 1816–9 (1956).

MORRIS O. WOLK, Primary Examiner

E. A. KATZ, Assistant Examiner

U.S. Cl. X.R.

23—254, 230, 253